(12) United States Patent
Horikawa et al.

(10) Patent No.: US 11,018,335 B2
(45) Date of Patent: May 25, 2021

(54) POSITIVE ELECTRODE FOR LITHIUM ION SECONDARY BATTERY AND MANUFACTURING METHOD THEREOF

(71) Applicants: TOYOTA JIDOSHA KABUSHIKI KAISHA, Toyota (JP); SUMITOMO METAL MINING CO., LTD., Tokyo (JP)

(72) Inventors: Daisuke Horikawa, Toyota (JP); Ryuta Sugiura, Toyohashi (JP); Satoshi Kanada, Niihama (JP); Tetsutaro Hayashi, Niihama (JP); Taira Aida, Niihama (JP)

(73) Assignees: TOYOTA JIDOSHA KABUSHIKI KAISHA, Toyota (JP); SUMITOMO METAL MINING CO., LTD., Tokyo (JP)

( * ) Notice: Subject to any disclaimer, the term of this patent is extended or adjusted under 35 U.S.C. 154(b) by 269 days.

(21) Appl. No.: 15/955,069

(22) Filed: Apr. 17, 2018

(65) Prior Publication Data
US 2018/0316003 A1 Nov. 1, 2018

(30) Foreign Application Priority Data
Apr. 28, 2017 (JP) .............................. JP2017-090249

(51) Int. Cl.
*H01M 4/36* (2006.01)
*H01M 4/62* (2006.01)
(Continued)

(52) U.S. Cl.
CPC ............ *H01M 4/366* (2013.01); *C01G 53/50* (2013.01); *H01M 4/131* (2013.01);
(Continued)

(58) Field of Classification Search
CPC ...................... H01M 4/624–626; H01M 4/366
See application file for complete search history.

(56) References Cited

U.S. PATENT DOCUMENTS

| | | |
|---|---|---|
| 2013/0295451 A1 | 11/2013 | Miki |
| 2017/0155134 A1 | 6/2017 | Sugiura |

FOREIGN PATENT DOCUMENTS

| | | |
|---|---|---|
| JP | H8-171909 A | 7/1996 |
| JP | 2000-235858 A | 8/2000 |

(Continued)

OTHER PUBLICATIONS

Machine translation of JP 2017-007918 A (Year: 2017).*
(Continued)

*Primary Examiner* — Robert S Carrico
(74) *Attorney, Agent, or Firm* — Sughrue Mion, PLLC (57) ABSTRACT

A positive electrode for a lithium ion secondary battery includes a positive electrode composite material layer. The positive electrode composite material layer includes composite particles and electron conductive particles. The composite particles include positive electrode active material particles and a coating film. The coating film is formed on the surface of the positive electrode active material particles. The coating film contains a first electron conductive oxide. The electron conductive particles are dispersed in the positive electrode composite material layer. The electron conductive particles contain a second electron conductive oxide. Each of the first electron conductive oxide and the second electron conductive oxide has a perovskite structure.

10 Claims, 2 Drawing Sheets

(51) Int. Cl.
  *C01G 53/00* (2006.01)
  *H01M 4/131* (2010.01)
  *H01M 4/1391* (2010.01)
  *H01M 4/525* (2010.01)
  *H01M 4/505* (2010.01)
  *H01M 4/02* (2006.01)
  *H01M 10/0525* (2010.01)

(52) U.S. Cl.
  CPC ......... *H01M 4/1391* (2013.01); *H01M 4/624* (2013.01); *C01P 2002/20* (2013.01); *C01P 2002/34* (2013.01); *C01P 2004/61* (2013.01); *C01P 2004/84* (2013.01); *C01P 2006/40* (2013.01); *H01M 4/505* (2013.01); *H01M 4/525* (2013.01); *H01M 10/0525* (2013.01); *H01M 2004/028* (2013.01)

(56) References Cited

FOREIGN PATENT DOCUMENTS

| | | | |
|---|---|---|---|
| JP | 2001-266879 A | | 9/2001 |
| JP | 2017007918 A | * | 1/2017 |
| JP | 2017-103058 A | | 6/2017 |
| KR | 10-2013-0107352 A | | 10/2013 |

OTHER PUBLICATIONS

Ting Shi et al., "Enhanced cycle stability at high rate and excellent high rate capability of $La_{0.7}Sr_{0.3}Mn_{0.7}Co_{0.3}O_3$-coated $LiMn_2O_4$", Journal of Power Sources, 2015, pp. 959-965 (7 pages).

* cited by examiner

FIG.1

POSITIVE ELECTRODE FOR LITHIUM ION SECONDARY BATTERY AND MANUFACTURING METHOD THEREOF

This non-provisional application is based on Japanese Patent Application No. 2017-090249 filed on Apr. 28, 2017 with the Japan Patent Office, the entire contents of which are hereby incorporated by reference.

BACKGROUND

Field

The present disclosure relates to a positive electrode for a lithium ion secondary battery and a method for manufacturing the same.

Description of the Background Art

Japanese Patent Application Laid-open No. 2001-266879 discloses a method for coating the surface of positive electrode active material particles with an electron conductive oxide having a perovskite structure.

SUMMARY

A positive electrode for a lithium ion secondary battery (hereinafter abbreviated as "positive electrode" where necessary) includes a positive electrode composite material layer. The positive electrode composite material layer contains positive electrode active material particles. Since the positive electrode active material particles has a low electron conductivity, the positive electrode composite material layer usually contains carbon black as a conductive aid.

In Japanese Patent Application Laid-open No. 2001-266879, the positive electrode active material particles are coated with an electron conductive oxide. Carbon black (amorphous carbon) and electron conductive oxide are heterogeneous materials. It is considered that the energy barrier for electron conduction between heterogeneous materials is high, which makes it difficult to smoothly connect the electron conduction paths. That is to say, there is a room left for improving the electron conductivity of the positive electrode composite material layer as a whole.

An object of the present disclosure is to provide a positive electrode for a lithium ion secondary battery with a reduced battery resistance.

Hereinafter, the technical configurations and effects of the present disclosure will be described. However, the mechanism of action described in the present disclosure includes assumptions. Whether the mechanism of action is correct or not should not limit the scope of the claims.

[1] A positive electrode for a lithium ion secondary battery includes a positive electrode composite material layer. The positive electrode composite material layer contains composite particles and electron conductive particles. The composite particle includes positive electrode active material particles and a coating film. The coating film is formed on the surface of the positive electrode active material particles. The coating film contains a first electron conductive oxide. The electron conductive particles are dispersed in the positive electrode composite material layer. The electron conductive particle contains a second electron conductive oxide. Each of the first electron conductive oxide and the second electron conductive oxide has a perovskite structure.

In the above configuration [1], the first electron conductive oxide coated on the surface of the positive electrode active material particles and the second electron conductive oxide dispersed in the positive electrode composite material layer have the same type of crystal structure. Therefore, it is expected that the electron band structures of the two oxides are substantially identical. As a result, the energy barrier for electron conduction is lowered, and it is expected that the electron conduction paths for the positive electrode active material particles, the coating film and the electron conductive particles may be linked smoothly. In other words, it is expected to improve the electron conductivity of the positive electrode composite material layer as a whole, which makes it possible to reduce the battery resistance.

[2] Each of the first electron conductive oxide and the second electron conductive oxide is represented by the following formula (I):

$$ABO_3 \qquad (I)$$

wherein, A represents an element contained in site A of the perovskite structure, B represents an element contained in site B of the perovskite structure, B is at least one element selected from a group consisting of Co, Ni and Mn, and O represents oxygen. It is expected that the perovskite type oxide containing at least one of Co (cobalt), Ni (nickel) and Mn (manganese) at site B may have a high electron conductivity.

[3] In the at least one of the first electron conductive oxide and the second electron conductive oxide, site B may contain Co. It is expected that the inclusion of Co in site B may suppress the formation of an inactive high resistance phase at the interface between the electron conductive oxide and the other materials.

[4] In at least one of the first electron conductive oxide and the second electron conductive oxide, site B may contain at least one element of Ni and Mn. It is expected that the inclusion of at least one element of Ni and Mn in site B may suppress the release of oxygen radicals due to the instability of the crystal structure. As a result, it is expected to suppress the oxidative decomposition of electrolyte solution, i.e., the generation of gas.

[5] In at least one of the first electron conductive oxide and the second electron conductive oxide, site B may contain (i) Co and (ii) at least one element of Ni and Mn. As a result, it is expected to suppress both the formation of the inactive high resistance phase and the release of oxygen radicals.

[6] The first electron conductive oxide and the second electron conductive oxide may have the same chemical composition. As a result, the electron band structures of both oxides become substantially identical, and it is expected to improve the electron conductivity of the positive electrode composite material layer as a whole.

[7] A method for manufacturing a positive electrode for a lithium ion secondary battery includes the following steps of (α) to (γ):

(α) preparing composite particles by forming a coating film on the surface of positive electrode active material particles;

(β) preparing a positive electrode composite material by mixing the composite particles and electron conductive particles; and (γ) manufacturing the positive electrode for a lithium ion secondary battery by forming a positive electrode composite material layer containing the positive electrode composite material.

The coating film contains a first electron conductive oxide. The electron conductive particles contain a second electron conductive oxide. Each of the first electron conductive oxide and the second electron conductive oxide has a perovskite structure.

According to the manufacturing method having the configuration [7], it is expected to improve the electron conductivity of the positive electrode composite material layer as a whole, which makes it possible to provide a positive electrode for a lithium ion secondary battery with a reduced battery resistance.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (referred to as "the present embodiment" where necessary) will be described. However, the following description will not limit the scope of the claims in any respect. In the specification of the present disclosure, for example, "at least one of A and B" should be considered as including "A only", "B only" and "both A and B".

<Positive Electrode for Lithium Ion Secondary Battery>

Figure 1:
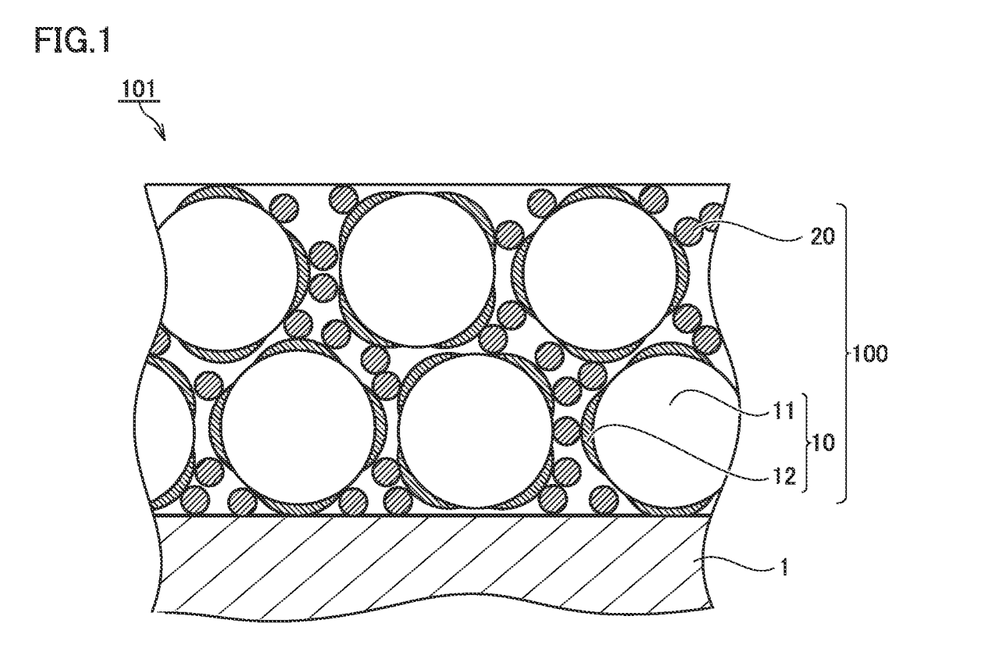
FIG. 1 is a diagram conceptually illustrating a configuration of a positive electrode for a lithium ion secondary battery according to an embodiment of the present disclosure.

FIG. 1 is a diagram conceptually illustrating a configuration of a positive electrode for a lithium ion secondary battery according to an embodiment of the present disclosure. A positive electrode 101 includes a current collector 1 and a positive electrode composite material layer 100. The current collector 1 may be, for example, an aluminum (Al) foil or the like. The Al foil may be a pure Al foil or an Al alloy foil. The current collector 1 may have a thickness of, for example, 10 to 30 μm.

(Positive Electrode Composite Material Layer)

The positive electrode composite material layer 100 is disposed on the surface of the current collector 1. The positive electrode composite material layer 100 may be disposed on both the front surface and the back surface of the current collector 1. The positive electrode composite material layer 100 contains composite particles 10 and electron conductive particles 20. The positive electrode composite material layer 100 may have a thickness of, for example, 10 to 100 μm. The positive electrode composite material layer 100 may have an apparent density of, for example, 2 to 4 g/cm³. The apparent density is calculated by dividing the mass of the positive electrode composite material layer 100 by the apparent volume of the positive electrode composite material layer 100, which is the product of the thickness of the positive electrode composite material layer 100 and the area thereof.

<Composite Particles>

The composite particles 10 includes positive electrode active material particles 11 and a coating film 12. The composite particles 10, for example, may have an average particle size of 1 to 30 μm, or an average particle size of 1 to 20 μm, or an average particle size of 5 to 15 μm. The "average particle size" in the specification represents the particle diameter of cumulative 50% from the fine particle side in a volume-based particle size distribution measured by a laser diffraction scattering method.

<Positive Electrode Active Material Particles>

The positive electrode active material particles 11 are composed of a positive electrode active material. The positive electrode active material particles 11 may be secondary particles aggregated from primary particles. The positive electrode active material particles 11 may have a uniform composition or may have a locally different composition. For example, the positive electrode active material particles 11 may contain two or more kinds of primary particles having different compositions. The positive electrode active material particles 11 (secondary particles) may have, for example, an average particle size of 1 to 30 μm, or an average particle size of 1 to 20 μm, or an average particle size of 5 to 15 μm.

The positive electrode active material can electrochemically adsorb lithium (Li) ions and electrochemically release Li ions. The positive electrode active material is not particularly limited. For example, the positive electrode active material may be a layered rock salt type oxide, a spinel oxide, an olivine compound or the like. The crystal structure of the positive electrode active material may be determined by, for example, the X-ray diffraction (XRD) method, the electron diffraction method, or the like. The chemical composition of the positive electrode active material particles 11 may be determined by, for example, the energy dispersive X-ray spectrometry (EDX) method or the like.

As examples of a layered rock salt type oxide, $LiNiO_2$, $LiCoO_2$, $LiMnO_2$, $LiNi_{1-e-f}Co_eAl_fO_2$ ($0 < e \leq 0.3$, and $0 < f \leq 0.1$) may be given. The layered rock salt type oxide may be a ternary layered rock salt type oxide. The ternary layered rock salt type oxide contains three kinds of transition metal elements (Ni, Co and Mn). The ternary layered rock salt type oxide is expected to have relatively higher specific capacity and better thermal stability.

In a ternary layered rock salt type oxide, a part of Ni, Co and Mn may be substituted by other elements. As a result, it is expected to reduce the gas generation amount, for example. The reason thereof may be that the partial substitution of elements may, for example, stabilize the crystal structure during charging.

In a ternary layered rock salt type oxide, a part of oxygen may be substituted by a halogen element. As a result, it is expected to reduce battery resistance, for example. The reason thereof may be that the Li ion concentration in the vicinity of the positive electrode active material particles 11 is increased since the halogen element has a higher electronegativity.

A ternary layered rock salt type oxide may be represented by, for example, the following formula (II):

$$Li_{1+a}Ni_bCo_cMn_{1-b-c}M_pO_{2-q}X_q \quad \text{(II)}$$

wherein, a, b, c, p and q satisfy $0 \leq a \leq 0.7$, $0.1 < b < 0.9$, $0.1 < c < 0.4$, $0 \leq p \leq 0.1$, $0 \leq q \leq 0.5$, M is at least one element selected from a group consisting of Zr (zirconium), Mo (molybdenum), W (tungsten), Mg (magnesium), Ca (calcium), Na (sodium), Fe (iron), Cr (chromium), Zn (zinc), Si (silicon), Sn (tin) and Al (aluminum), and X is at least one element selected from a group consisting of F (fluorine), Cl (chlorine) and Br (bromine).

As examples of a spinel oxide, $LiMn_2O_4$, $LiNi_{0.5}Mn_{1.5}O_4$, and the like may be given. As examples of an olivine compound, $LiFePO_4$, $LiMnPO_4$ and the like may be given.

<Coating Film>

The coating film 12 is formed on the surface of the positive electrode active material particles 11. The coating film 12 contains a first electron conductive oxide. The coating film 12 may contain, for example, a Li ion conductive oxide or the like as long as it contains the first electron conductive oxide. The coating film 12 may substantially contain only the first electron conductive oxide. The crystal structure and the chemical composition of the first electron conductive oxide will be described later. The coating film 12 may contain only one kind of the first electron conductive oxide or may contain two or more kinds of the first electron conductive oxides.

The coating film 12 may cover the entire surface of the positive electrode active material particles 11 or a part of the surface of the positive electrode active material particles 11. Since at least a part of the surface of the positive electrode active material particles 11 is covered by the coating film 12, it is expected to improve its electron conductivity. The coating film 12 may have a thickness of, for example, 1 nm to 1 μm.

<Electron Conductive Particles>

The electron conductive particles 20 are dispersed in the positive electrode composite material layer 100. The electron conductive particles 20 may be smaller than the composite particles 10. For example, the electron conductive particles 20 may have an average particle size of 0.01 to 10 μm or an average particle size of 0.1 to 1 μm.

The electron conductive particles 20 contain a second electron conductive oxide. The electron conductive particles 20 may substantially contain only the second electron conductive oxide. The crystal structure and the chemical composition of the second electron conductive oxide will be described later. The positive electrode composite material layer 100 may contain only one kind of the electron conductive particles 20 (the second electron conductive oxide), or may contain two or more kinds of the electron conductive particles 20 (the second electron conductive oxide).

(First Electron Conductive Oxide, Second Electron Conductive Oxide)

In the positive electrode composite material layer 100, each of the first electron conductive oxide and the second electron conductive oxide has a perovskite structure. That is to say, the first electron conductive oxide coated on the surface of the positive electrode active material particles 11 and the second electron conductive oxide dispersed in the positive electrode composite material layer 100 have the same crystal structure. Therefore, it is expected that the electron band structures of the two oxides are substantially identical. As a result, the energy barrier for electron conduction is lowered, and it is expected that the electron conduction paths for the positive electrode active material particles 11, the coating film 12 and the electron conductive particles 20 may be linked smoothly. In other words, it is expected to improve the electron conductivity of the positive electrode composite material layer 100 as a whole.

Each of the first electron conductive oxide and the second electron conductive oxide has, for example, a ratio of 0.01 mol % or more to 3 mol % or less, or a ratio of 0.1 mol % or more to 2 mol % or less, or a ratio of 0.5 mol % or more to 1 mol % or less with respect to the total amount of the positive electrode active material contained in the positive electrode composite material layer 100.

The total amount of the first electron conductive oxide and the second electron conductive oxide has, for example, a ratio of 0.02 mol % or more to 6 mol % or less, or a ratio of 0.2 mol % or more to 4 mol % or less, or a ratio of 1 mol % or more to 2 mol % or less with respect to the total amount of the positive electrode active material contained in the positive electrode composite material layer 100.

As long as each of the first electron conductive oxide and the second electron conductive oxide has a perovskite structure, the first electron conductive oxide and the second electron conductive oxide may have different chemical compositions. It is considered that the electron conductivity may be improved even if the chemical compositions of the two oxide are different.

The first electron conductive oxide and the second electron conductive oxide may have the same chemical composition. Since the chemical compositions are the same, the electron band structures of both are identical. As a result, it is expected to improve the electron conductivity of the positive electrode composite material layer 100 as a whole.

The crystal structure of the first electron conductive oxide and the second electron conductive oxide may be determined by the XRD method, the electron diffraction method or the like. The chemical composition of the first electron conductive oxide and the second electron conductive oxide may be determined by the EDX method or the like. For example, the positive electrode composite material layer 100 or the positive electrode 101 is embedded in a given resin. A cross-sectional sample of the composite particles 10 and a cross-sectional sample of the positive electrode composite material layer 100 are prepared through a focusing ion beam (FIB) process. The cross-sectional samples may be analyzed by using a scanning transmission electron microscope (STEM)-EDX equipment.

The crystal structure of the first electron conductive oxide may be determined from the cross-sectional sample of the composite particles 10 according to the electron diffraction pattern of the coating film 12. The chemical composition of the first electron conductive oxide may be determined according to the EDX analysis (spot analysis) of the coating film 12. The crystal structure of the second electron conductive oxide may be determined from the cross-sectional sample of the positive electrode composite material layer 100 according to the electron diffraction pattern of the electron conductive particles 20. The chemical composition of the second electron conductive oxide may be determined according to the EDX analysis (spot analysis) of the electron conductive particles 20. The chemical composition may be determined by arithmetically averaging the measurement results obtained from at least three different locations.

The thickness of the coating film 12 may also be determined from the cross-sectional sample of the composite particles 10. The thickness of the coating film 12 may be determined by arithmetically averaging the measurement results obtained from at least three different locations.

Each of the first electron conductive oxide and the second electron conductive oxide is represented by the following formula (I):

$$ABO_3 \qquad (I)$$

wherein, A represents an element contained in site A of the perovskite structure, B represents an element contained in site B of the perovskite structure, B is at least one element selected from a group consisting of Co, Ni and Mn, and O represents oxygen. The perovskite type oxide containing at least one of Co, Ni and Mn at site B is expected to have a high electron conductivity.

In the above formula (I), A may be, for example, at least one element selected from a group consisting of rare earth elements and alkaline earth metal elements. A may be, for example, at least one element of La (lanthanum) and Sr (strontium).

In the above formula (I), a part of the oxygen at the oxygen site may be deficient, which may result in electrical neutrality. The amount of deficiency may be, for example, about 0 to 0.5 mol with respect to 3 mol of oxygen. In other words, the oxygen site "$O_3$" in the above formula (I) may be represented as "$O_{3-d}$" ($0 \leq d \leq 1.0$).

In the above formula (I), a part of site A and site B may be also deficient. That is to say, the composition ratio of A and B in the formula (I) may be smaller than 1. The amount of deficiency in site A may be, for example, about 0 to 0.4 mol with respect to 1 mol. The amount of deficiency in site B may be, for example, about 0 to 0.4 mol with respect to 1 mol.

In at least one of the first electron conductive oxide and the second electron conductive oxide, site B may contain Co. The inclusion of Co in site B is expected to suppress the formation of an inactive high resistance phase at the interface between the electron conductive oxide and the other materials. It is considered that the high resistance phase is formed, for example, in the process of forming the electron conductive oxide, or in the process of charging and discharging the positive electrode 101.

In at least one of the first electron conductive oxide and the second electron conductive oxide, site B may contain at least one element of Ni and Mn. The inclusion of at least one element of Ni and Mn in site B is expected to suppress the release of oxygen radicals due to the instability of the crystal structure. As a result, it is expected to suppress the oxidative decomposition of electrolyte solution, i.e., the generation of gas.

In at least one of the first electron conductive oxide and the second electron conductive oxide, site B may contain (i) Co and (ii) at least one element of Ni and Mn. As a result, it is expected to suppress the formation of the inactive high resistance phase and the release of oxygen radicals.

As described in the above, each of the first electron conductive oxide and the second electron conductive oxide may be represented by, for example, the following formula (III):

$$A_w Co_x Ni_y Mn_z O_{3-d} \quad \text{(III)}$$

wherein,

A represents an element contained in site A of the perovskite structure.

A is at least one element selected from a group consisting of rare earth elements and alkaline earth metal elements. A may be at least one element of La and Sr.

Co, Ni and Mn are contained in site B of the perovskite structure.

wherein,

W satisfies $0.6 \leq w \leq 1$.

x, y and z satisfy $0 \leq x \leq 1$, $0 \leq y \leq 1$, $0 \leq z \leq 1$, and $0.6 \leq x+y+z \leq 1$.

D satisfies $0 \leq d \leq 1.0$.

In the above formula (III), when x=0, y and z may satisfy $0.2 \leq y \leq 0.8$, $0.2 \leq z \leq 0.8$, and y+z=1, or y and z may satisfy $0.2 \leq y \leq 0.5$ and y+z=1.

In the above formula (III), when y=0, z and x may satisfy $0.2 \leq z \leq 0.8$, $0.2 \leq x \leq 0.8$, and x+z=1, or z and x may satisfy $0.2 \leq z \leq 0.5$ and x+z=1.

In the above formula (III), when z=0, x and y may satisfy $0.2 \leq x \leq 0.8$, $0.2 \leq y \leq 0.8$, and x+y=1, or x and y may satisfy $0.2 \leq x \leq 0.5$ and x+y=1.

Each of the first electron conductive oxide and the second electron conductive oxide may be, for example, at least one compound selected from each of the first group to the fifth group in the following.

(First Group)

The first group consists of $LaCoO_3$, $LaNiO_3$, $LaMnO_3$, $LaCo_{0.8}Mn_{0.2}O_3$, $LaCo_{0.5}Mn_{0.5}O_3$, $LaCo_{0.2}Mn_{0.8}O_3$, $LaCo_{0.8}Ni_{0.2}O_3$, $LaCo_{0.5}Ni_{0.5}O_3$, $LaCo_{0.2}Ni_{0.8}O_3$, $LaNi_{0.8}Mn_{0.2}O_3$, $LaNi_{0.5}Mn_{0.5}O_3$, $LaNi_{0.2}Mn_{0.8}O_3$, $LaCo_{0.3}Ni_{0.4}Mn_{0.3}O_3$, $LaCo_{0.4}Ni_{0.3}Mn_{0.3}O_3$, $LaCo_{0.3}Ni_{0.3}Mn_{0.4}O_3$, and $LaCo_{1/3}Ni_{1/3}Mn_{1/3}O_3$.

(Second Group)

The second group consists of $SrCoO_3$, $SrNiO_3$, $SrMnO_3$, $SrCo_{0.8}Mn_{0.2}O_3$, $SrCo_{0.5}Mn_{0.5}O_3$, $SrCo_{0.2}Mn_{0.8}O_3$, $SrCo_{0.8}Ni_{0.2}O_3$, $SrCo_{0.5}Ni_{0.5}O_3$, $SrCo_{0.2}Ni_{0.8}O_3$, $SrNi_{0.8}Mn_{0.2}O_3$, $SrNi_{0.5}Mn_{0.5}O_3$, $SrNi_{0.2}Mn_{0.8}O_3$, $SrCo_{0.3}Ni_{0.4}Mn_{0.3}O_3$, $SrCo_{0.4}Ni_{0.3}Mn_{0.3}O_3$, $SrCo_{0.3}Ni_{0.4}Mn_{0.4}O_3$, and $SrCo_{1/3}Ni_{1/3}Mn_{1/3}O_3$.

(Third Group)

The third group consists of $La_{0.2}Sr_{0.8}CoO_3$, $La_{0.2}Sr_{0.8}NiO_3$, $La_{0.2}Sr_{0.8}MnO_3$, $La_{0.2}Sr_{0.8}Co_{0.8}Mn_{0.2}O_3$, $La_{0.2}Sr_{0.8}Co_{0.5}Mn_{0.5}O_3$, $La_{0.2}Sr_{0.8}Co_{0.2}Mn_{0.8}O_3$, $La_{0.2}Sr_{0.8}Co_{0.8}Ni_{0.2}O_3$, $La_{0.2}Sr_{0.8}Co_{0.5}Ni_{0.5}O_3$, $La_{0.2}Sr_{0.8}Co_{0.2}Ni_{0.8}O_3$, $La_{0.2}Sr_{0.8}Ni_{0.8}Mn_{0.2}O_3$, $La_{0.2}Sr_{0.8}Ni_{0.5}Mn_{0.5}O_3$, $La_{0.2}Sr_{0.8}Ni_{0.2}Mn_{0.8}O_3$, $La_{0.2}Sr_{0.8}Co_{0.3}Ni_{0.4}Mn_{0.3}O_3$, $La_{0.2}Sr_{0.8}Co_{0.4}Ni_{0.3}Mn_{0.3}O_3$, $La_{0.2}Sr_{0.8}Co_{0.3}Ni_{0.3}Mn_{0.4}O_3$, and $La_{0.2}Sr_{0.8}Co_{1/3}Ni_{1/3}Mn_{1/3}O_3$.

(Fourth Group)

The fourth group consists of $La_{0.5}Sr_{0.5}CoO_3$, $La_{0.5}Sr_{0.5}NiO_3$, $La_{0.5}Sr_{0.5}MnO_3$, $La_{0.5}Sr_{0.5}Co_{0.8}Mn_{0.2}O_3$, $La_{0.5}Sr_{0.5}Co_{0.5}Mn_{0.5}O_3$, $La_{0.5}Sr_{0.5}Co_{0.2}Mn_{0.8}O_3$, $La_{0.5}Sr_{0.5}Co_{0.8}Ni_{0.2}O_3$, $La_{0.5}Sr_{0.5}Co_{0.5}Ni_{0.5}O_3$, $La_{0.5}Sr_{0.5}Co_{0.2}Ni_{0.8}O_3$, $La_{0.5}Sr_{0.5}Ni_{0.8}Mn_{0.2}O_3$, $La_{0.5}Sr_{0.5}Ni_{0.5}Mn_{0.5}O_3$, $La_{0.5}Sr_{0.5}Ni_{0.2}Mn_{0.8}O_3$, $La_{0.5}Sr_{0.5}Co_{0.3}Ni_{0.4}Mn_{0.3}O_3$, $La_{0.5}Sr_{0.5}Co_{0.4}Ni_{0.3}Mn_{0.3}O_3$, $La_{0.5}Sr_{0.5}Co_{0.3}Ni_{0.3}Mn_{0.4}O_3$, and $La_{0.5}Sr_{0.5}Co_{1/3}Ni_{1/3}Mn_{1/3}O_3$.

(Fifth Group)

The fifth group consists of $La_{0.8}Sr_{0.2}CoO_3$, $La_{0.8}Sr_{0.2}NiO_3$, $La_{0.8}Sr_{0.2}MnO_3$, $La_{0.8}Sr_{0.2}Co_{0.8}Mn_{0.2}O_3$, $La_{0.8}Sr_{0.2}Co_{0.5}Mn_{0.5}O_3$, $La_{0.8}Sr_{0.2}Co_{0.2}Mn_{0.8}O_3$, $La_{0.8}Sr_{0.2}Co_{0.8}Ni_{0.2}O_3$, $La_{0.8}Sr_{0.2}Co_{0.5}Ni_{0.5}O_3$, $La_{0.8}Sr_{0.2}Co_{0.2}Ni_{0.8}O_3$, $La_{0.8}Sr_{0.2}Ni_{0.8}Mn_{0.2}O_3$, $La_{0.8}Sr_{0.2}Ni_{0.5}Mn_{0.5}O_3$, $La_{0.8}Sr_{0.2}Ni_{0.2}Mn_{0.8}O_3$, $La_{0.8}Sr_{0.2}Co_{0.3}Ni_{0.4}Mn_{0.3}O_3$, $La_{0.8}Sr_{0.2}Co_{0.4}Ni_{0.3}Mn_{0.3}O_3$, $La_{0.5}Sr_{0.2}Co_{0.3}Ni_{0.3}Mn_{0.4}O_3$, and $La_{0.8}Sr_{0.2}Co_{1/3}Ni_{1/3}Mn_{1/3}O_3$.

Each of the first electron conductive oxide and the second electron conductive oxide may be at least one compound selected from a group consisting of, for example, $LaCoO_3$, $LaNiO_3$, $LaMnO_3$, $LaCo_{0.8}Mn_{0.2}O_3$, $LaCo_{0.5}Mn_{0.5}O_3$, $LaCo_{0.2}Mn_{0.8}O_3$, $LaCo_{0.8}Ni_{0.2}O_3$, $LaCo_{0.5}Ni_{0.5}O_3$, $LaCo_{0.2}Ni_{0.8}O_3$, $LaCo_{0.3}Ni_{0.4}Mn_{0.3}O_3$, $SrCo_{0.5}Ni_{0.5}O_3$, $La_{0.5}Sr_{0.5}Co_{0.5}Ni_{0.5}O_3$, $LaCo_{0.1}Mn_{0.4}Ni_{0.3}O_3$ and $La_{0.7}Co_{0.1}Mn_{0.4}Ni_{0.3}O_{2.55}$.

<Other Materials>

The positive electrode composite material layer 100 may further contain other materials (not shown) as long as it contains the composite particles 10 and the electron conductive particles 20. For example, the positive electrode composite material layer 100 may further contain non-oxide electron conductive particles, a binder, and the like.

The non-oxide electron conductive particles is not particularly limited. As examples of the non-oxide electron conductive particles, carbon black such as acetylene black, thermal black and furnace black, graphite, vapor grown carbon fiber (VGCF) and the like may be given. The non-oxide electron conductive particles may be used alone or in a combination of two or more kinds. The non-oxide electron conductive particles may have a ratio of, for example, 1 to 10 mass % with respect to the mass of the composite particles 10.

The binder is not particularly limited. As examples of the binder, polyvinylidene fluoride (PVdF), polytetrafluoroethylene (PTFE), carboxymethyl cellulose (CMC), polyacrylic acid (PAA) and the like may be given. The binder may be used alone or in a combination of two or more kinds. The binder may have a ratio of, for example, 1 to 10 mass % with respect to the mass of the composite particles 10.

<Method for Manufacturing Positive Electrode for Lithium Ion Secondary Battery>

Figure 2:
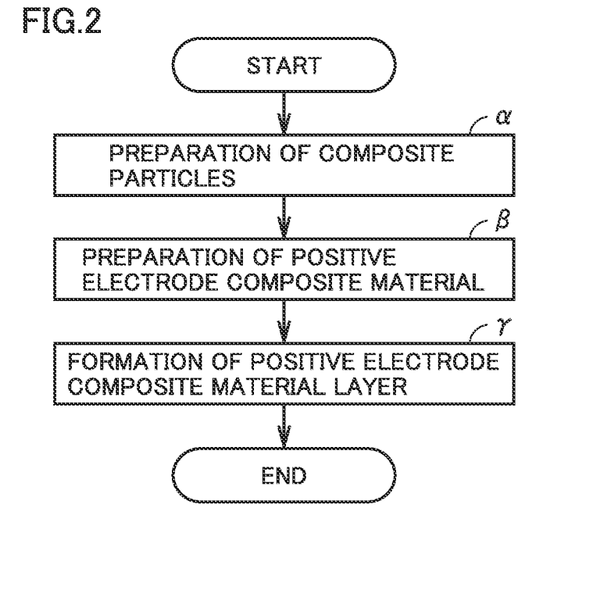
FIG. 2 is a flowchart schematically illustrating a method for manufacturing a positive electrode for a lithium ion secondary battery according to an embodiment of the present disclosure.

FIG. 2 is a flowchart schematically illustrating a method for manufacturing a positive electrode for a lithium ion secondary battery according to an embodiment of the present disclosure. The manufacturing method of the present embodiment includes (α) preparation of composite particles, (β) preparation of positive electrode composite material, and (γ) formation of positive electrode composite material layer. Hereinafter, the manufacturing method of the present embodiment will be explained step by step.

(α) Preparation of Composite Particles

The manufacturing method of the present embodiment includes preparing the composite particles 10 by forming the coating film 12 on the surface of the positive electrode active material particles 11. The coating film 12 is formed to contain the first electron conductive oxide. Details of the positive electrode active material particles 11 and the first electron conductive oxide have been described in the above.

First is to prepare the positive electrode active material particles 11. The positive electrode active material particles 11 may be purchased or synthesized. Next, the coating film 12 is formed. The method of forming the coating film 12 is not particularly limited. The coating film 12 may be formed by, for example, a solid phase method, a liquid phase method, a gas phase method, or the like. As examples of the liquid phase method, a co-precipitation method, a sol-gel method, a hydrothermal synthesis method, a liquid phase reduction method and the like may be given. As examples of the gas phase method, an atomic layer deposition (ALD) method, a chemical vapor deposition (CVD) method and the like may be given.

Here, as an example, a method of forming the coating film 12 is described. In the method, a precursor of the coating film 12 is firstly bonded to the surface of the positive electrode active material particles 11 by the co-precipitation method, and then the precursor is heated to form the coating film 12. However, the method of forming the coating film described in the above is merely an example, and is not particularly limited.

Then, a salt of elements to be contained in site A is prepared. Hereinafter, the salt of elements to be contained in site A may be written as the "site A raw material" for the sake of convenience. The site A raw material is, for example, La sulfate or the like.

Subsequently, a salt of elements to be contained in site B is prepared. Hereinafter, the salt of elements to be contained in site B may be written as "site B raw material" for the sake of convenience. The site B raw material is, for example, Co sulfate or the like.

The site A raw material and the site B raw material are weighed so that the molar ratio of La and Co is, for example, 1:1. The site A raw material and the site B raw material are dissolved in pure water to prepare a raw material aqueous solution. The positive electrode active material particles 11 are added into the raw material aqueous solution and stirred. By heating the mixture of the raw material aqueous solution and the positive electrode active material particles 11 to 50 to 100° C., the solvent (i.e., water) is removed. Thereby, the precursor of the coating film 12 is bonded to the surface of the positive electrode active material particles 11.

The obtained powder is heated to 300 to 600° C. The heating time may be, for example, about 2 to 10 hours. Thereby, a first electron conductive oxide (for example, $LaCoO_3$) is obtained from the precursor. That is to say, the coating film 12 is formed on the surface of the positive electrode active material particles 11. The coating film 12 contains the first electron conductive oxide. Thereby, the preparation of the composite particles 10 is achieved.

(β) Preparation of Positive Electrode Composite Material

The manufacturing method of the present embodiment includes preparing a positive electrode composite material by mixing the composite particles 10 and the electron conductive particles 20. The electron conductive particles 20 contains the second electron conductive oxide. Details of the electron conductive particles have been described in the above. The electron conductive particles 20 may be purchased or synthesized.

The positive electrode composite material may be prepared by any conventionally known method. For example, the composite particles 10, the electron conductive particles 20, a binder, a dispersant, a solvent and the like may be mixed at a predetermined mass ratio so as to prepare a paste containing the positive electrode composite material. Hereinafter, the paste containing the positive electrode composite material is referred to as the "positive electrode paste" where necessary. For example, a stirring machine such as a planetary mixer may be used in the mixing operation. The solvent may be selected according to the type of the binder. For example, when the binder is PVdF, N-methyl-2-pyrrolidone (NMP) may be used as the solvent.

(γ) Formation of Positive Electrode Composite Material Layer

The manufacturing method of the present embodiment includes manufacturing the positive electrode for a lithium ion secondary battery by forming the positive electrode composite material layer 100 containing the positive electrode composite material. First is to prepare the current collector 1. Details of the current collector 1 have been described in the above. Next, a positive electrode paste is coated on the surface of the current collector 1 by using a coating machine such as a die coater and dried. Thereby, the positive electrode composite material layer 100 containing the positive electrode composite material is achieved. The positive electrode composite material layer 100 may be disposed on both the front surface and the back surface of the current collector 1. The positive electrode composite material layer 100 may be rolled by using a rolling machine or the like.

As described in the above, the positive electrode 101 is manufactured. The positive electrode 101 may be cut into a predetermined shape (such as a band shape or a rectangular shape) to meet the specifications of the lithium ion secondary battery.

\<Applications\>

It is expected that the battery resistance of the lithium ion secondary battery including the positive electrode 101 is reduced. That is to say, the lithium ion secondary battery is expected to have a high output power. As an example of applications, the lithium ion secondary battery having a high output power may be used for example as a power source in a hybrid vehicle (HV), a plug-in hybrid vehicle (PHV), or an electric vehicle (EV).

However, the application of the lithium ion secondary battery including the positive electrode 101 should not be limited to such vehicle applications. The lithium ion secondary battery including the positive electrode 101 may be used in various applications.

EXAMPLES

Hereinafter, examples of the present disclosure will be described. It should be noted that none of the following examples limits the scope of the claims.

Example 1

1. (α) Preparation of Composite Particles

Ni sulfate, Co sulfate and Mn sulfate were weighted so that the molar ratio of Ni and Co and Mn is 1:1:1, and dissolved in pure water to yield an aqueous sulfate solution. An aqueous solution of sodium hydroxide (NaOH) was dropped into the aqueous sulfate solution to yield a precursor (co-precipitated hydroxide) of the positive electrode active material. The precursor was washed with pure water, and the precursor after washing was dried. The precursor after drying was mixed with lithium carbonate ($Li_2CO_3$) to give a mixture. The mixture was heated at 900° C. for 15 h to yield a burned material. The burned material was pulverized by using a ball miller.

As described in the above, the positive electrode active material particles were prepared. The positive electrode active material particles are composed of a positive electrode active material ($LiNi_{1/3}Co_{1/3}Mn_{1/3}O_2$). The positive electrode active material particles had an average particle size of 10 μm. $LiNi_{1/3}Co_{1/3}Mn_{1/3}O_2$ is a ternary layered rock salt type oxide. $LiNi_{1/3}Co_{1/3}Mn_{1/3}O_2$ satisfies the above formula (II). Hereinafter, the positive electrode active material particles may be abbreviated as "NCM" where necessary.

La sulfate was prepared as the site A raw material, and Co sulfate was prepared as the site B raw material. The site A raw material and the site B raw material were weighed so that the molar ratio of La and Co is 1:1. The site A raw material and the site B raw material were dissolved in pure water to prepare an aqueous raw material solution. The positive electrode active material particles were added into the raw material aqueous solution and stirred. By heating the mixture of the raw material aqueous solution and the positive electrode active material particles to 60° C., the solvent (water) was removed. Thereby, the precursor of the coating film is bonded to the surface of the positive electrode active material particles.

The obtained powder was heated at 450° C. for 5 hours. As a result, a coating film was formed from the precursor. As described in the above, the composite particles were prepared. The composite particle includes positive electrode active material particles and a coating film. The coating film contains a first electron conductive oxide ($LaCoO_3$). $LaCoO_3$ has a perovskite structure ($ABO_3$). The first electron conductive oxide has a ratio of 0.5 mol % with respect to the mole amount of the positive electrode active material.

2. (β) Preparation of Positive Electrode Composite Material

The following materials were prepared. Specifically, $LaMnO_3$ was prepared as the electron conductive particles (second electron conductive oxide), acetylene black was prepared as the non-oxide electron conductive particles, PVdF was prepared as the binder, polyvinyl pyrrolidone was prepared as the dispersant, and NMP was prepared as the solvent.

The composite particles, the non-oxide electron conductive particles, the binder, the dispersant, and the solvent prepared in the above were mixed with a planetary mixer to yield a positive electrode paste. The ratio of the solid contents in the positive electrode paste was 50% by mass. The ratio of the solid contents, in other words, the composite particles: the electron conductive particles: the non-oxide electron conductive particles: the binder in the positive electrode paste was 84:6:6:4 by mass. The dispersant was 0.2% by mass with respect to the solid contents. The second electron conductive oxide was 0.5 mol % with respect to the mole amount of the positive electrode active material. The second electron conductive oxide ($LaMnO_3$) has a perovskite structure ($ABO_3$).

3. (γ) Formation of Positive Electrode Composite Material Layer

An Al foil was prepared as the current collector. The positive electrode paste was applied to the surfaces (both the front surface and the back surface) of the current collector by using a die coater and then dried. Thereby, a positive electrode composite material layer containing the positive electrode composite material was formed on the surfaces of the current collector. The positive electrode composite material layer may have the same composition as the composition of the solid contents in the positive electrode paste. The positive electrode composite material layer was rolled by using a rolling machine. As described in the above, the positive electrode was manufactured. The positive electrode was cut into bands by using a slitter.

4. Manufacturing of Lithium Ion Secondary Battery

A band-shaped negative electrode and a band-shaped separator were prepared, respectively. The positive electrode, the separator and the negative electrode were laminated so that the positive electrode and the negative electrode are opposed to each other with the separator interposed therebetween, and then wound into a coil. Thereby, an electrode group was obtained. Terminals were connected to the positive electrode and the negative electrode, respectively. The electrode group was housed in the battery case, an electrolyte solution was injected into the battery case, and thereafter, the battery case sealed. Thereby, a lithium ion secondary battery including a positive electrode was manufactured. Hereinafter, the lithium ion secondary battery may be abbreviated as "battery" where necessary.

Examples 2 to 14

As shown in the following Table 1, except that the first electron conductive oxide and the second electron conductive oxide were modified in each example, the positive electrode and the battery including the positive electrode were manufactured in the same manner as in Example 1. The first electron conductive oxide and the second electron conductive oxide shown in Table 1 below each have a perovskite structure ($ABO_3$).

Comparative Example 1

Except that the first electron conductive oxide and the second electron conductive oxide were not used, the positive electrode and the battery including the positive electrode were manufactured in the same manner as in Example 1. In Comparative Example 1, the ratio of the solid contents, in other words, the positive electrode active material particles: the electron conductive particles: the non-oxide electron conductive particles: the binder in the positive electrode paste was 84:12:4 by mass.

Comparative Example 2

Except that the electron conductive particles (second electron conductive oxide) were not used, the positive electrode and the battery including the positive electrode were manufactured in the same manner as in Example 1. In Comparative Example 2, the ratio of the solid contents, in other words, the composite particles: the electron conductive particles: the non-oxide electron conductive particles: the binder in the positive electrode paste was 84:12:4 by mass. The first electron conductive oxide was 1 mol % with respect to the mole amount of the positive electrode active material.

Comparative Example 3

Except that the coating film (first electron conductive oxide) was not formed on the surface of the positive electrode active material particles, the positive electrode and the battery including the positive electrode were manufactured in the same manner as in Example 1. In Comparative Example 3, the ratio of the solid contents, in other words, the positive electrode active material particles: the electron conductive particles: the non-oxide electron conductive particles: the binder in the positive electrode paste was 84:12:4 by mass. The second electron conductive oxide was 1 mol % with respect to the mole amount of the positive electrode active material.

<Evaluations>
1. Activation of Battery and Measurement of Initial Capacity

At 25° C., the battery was fully charged according to a constant current-constant voltage charge (CCCV charge) approach with the following conditions. Next, the battery was discharged according to a constant current discharge (CC discharge) approach with the following conditions. The discharged capacity at this moment was measured as the initial capacity. Note that "1C" indicates a current used to discharge the full charge capacity in one hour.

Conditions of the CCCV charge approach: CC current=⅓C, CV voltage=4.2V, cutoff current=1/50C Conditions of the CC discharge approach: current=⅓C, cutoff voltage=3.0V 2. Evaluation of Battery Resistance The SOC (State Of Charge) of the battery was adjusted to 60%. At −10° C., the battery was discharged until the voltage across the terminals reached 3.0V. The discharge was performed according to the CC discharge approach. The voltage drop across the terminals after the start of discharge for 5 seconds was measured. The battery resistance was calculated by dividing the voltage drop across the terminal by the discharge current. The results are shown in the column of "battery resistance" in Table 1 below. The value shown in the table is a relative value when the battery resistance of Comparative Example 1 is set to 100. The smaller the value, the lower the battery resistance is.

3. Evaluation of Gas Generation Amount

The charging and discharging was repeated for 1000 cycles by using a current of 2 C at 60° C. After 1000 cycles, the battery was immersed in insulating oil. The battery case was opened in the insulating oil. Gas generated from the battery case was collected by a measuring cylinder. In this way, the volume of the gas (gas generation amount) was measured. The results are shown in the column of "gas generation amount" in Table 1 below. The value shown in the table is a relative value when the gas generation amount of Comparative Example 1 is set to 100.

TABLE 1

| | Lists of Examples and Comparative Examples | | | | |
|---|---|---|---|---|---|
| | positive electrode composite material layer | | | battery performance | |
| | composite particles | | electron conductive particles | battery | gas generation |
| | positive electrode active material particles | first electron conductive oxide (ABO$_3$) | second electron conductive oxide (ABO$_3$) | resistance [—] | amount [—] |
| Comparative Example 1 | NCM | — | — | 100 | 100 |
| Comparative Example 2 | NCM | LaCoO$_3$ | — | 91 | 121 |
| Comparative Example 3 | NCM | — | LaCoO$_3$ | 88 | 119 |
| Example 1 | NCM | LaCoO$_3$ | LaMnO$_3$ | 85 | 110 |
| Example 2 | NCM | LaCoO$_3$ | LaCoO$_3$ | 62 | 139 |
| Example 3 | NCM | LaCo$_{0.5}$Mn$_{0.5}$O$_3$ | LaCo$_{0.5}$Mn$_{0.5}$O$_3$ | 60 | 101 |
| Example 4 | NCM | LaCo$_{0.8}$Mn$_{0.2}$O$_3$ | LaCo$_{0.8}$Mn$_{0.2}$O$_3$ | 59 | 110 |
| Example 5 | NCM | LaCo$_{0.2}$Mn$_{0.8}$O$_3$ | LaCo$_{0.2}$Mn$_{0.8}$O$_3$ | 63 | 98 |
| Example 6 | NCM | LaMnO$_3$ | LaMnO$_3$ | 83 | 100 |
| Example 7 | NCM | LaCo$_{0.8}$Ni$_{0.2}$O$_3$ | LaCo$_{0.8}$Ni$_{0.2}$O$_3$ | 59 | 118 |
| Example 8 | NCM | LaCo$_{0.5}$Ni$_{0.5}$O$_3$ | LaCo$_{0.5}$Ni$_{0.5}$O$_3$ | 63 | 107 |
| Example 9 | NCM | LaCo$_{0.2}$Ni$_{0.8}$O$_3$ | LaCo$_{0.2}$Ni$_{0.8}$O$_3$ | 69 | 100 |
| Example 10 | NCM | LaNiO$_3$ | LaNiO$_3$ | 82 | 101 |
| Example 11 | NCM | LaCo$_{0.1}$Mn$_{0.4}$Ni$_{0.3}$O$_3$ | LaCo$_{0.1}$Mn$_{0.4}$Ni$_{0.3}$O$_3$ | 60 | 105 |
| Example 12 | NCM | SrCo$_{0.5}$Ni$_{0.5}$O$_3$ | SrCo$_{0.5}$Ni$_{0.5}$O$_3$ | 59 | 103 |
| Example 13 | NCM | La$_{0.5}$Sr$_{0.5}$Co$_{0.5}$Ni$_{0.5}$O$_3$ | La$_{0.5}$Sr$_{0.5}$Co$_{0.5}$Ni$_{0.5}$O$_3$ | 60 | 99 |
| Example 14 | NCM | La$_{0.7}$Co$_{0.1}$Mn$_{0.4}$Ni$_{0.3}$O$_{2.55}$ | La$_{0.7}$Co$_{0.1}$Mn$_{0.4}$Ni$_{0.3}$O$_{2.55}$ | 58 | 104 |

In Comparative Examples 2 and 3, the first electron conductive oxide or the second electron conductive oxide is 1 mol % with respect to the total amount of the positive electrode active material contained in the positive electrode composite material layer.

In Examples 1 to 14, each of the first electron conductive oxide and the second electron conductive oxide is 0.5 mol % with respect to the total amount of the positive electrode active material contained in the positive electrode active material layer. The sum of the first electron conductive oxide and the second electron conductive oxide is 1 mol % with respect to the total amount of the positive electrode active material contained in the positive electrode composite material layer.

<Results>

As shown in the above Table 1, compared with Comparative Examples 1 to 3, the battery resistance is reduced in each of the examples. It is considered that the reason is that in each of the examples, the electron conduction path may be linked smoothly between the first electron conductive oxide coated on the surface of the positive electrode active material particle and the second electron conductive oxide dispersed in the positive electrode composite material layer.

Since the first electron conductive oxide and the second electron conductive oxide have the same chemical composition, it is observed that the battery resistance tends to decrease (Examples 1 and 2). The considerable the reason may be that the electron band structures of the two oxides are substantially identical.

In at least one of the first electron conductive oxide and the second electron conductive oxide, due to the inclusion of Co in site B, it is observed that the battery resistance tends to decrease (Examples 2, 6 and 10). The considerable the reason may be that the formation of an inactive high resistance phase at the interface between the electron conductive oxide and other materials is suppressed.

In at least one of the first electron conductive oxide and the second electron conductive oxide, due to the inclusion of at least one element of Ni and Mn in site B, it is observed that the gas generation amount tends to decrease (Example 2, 6 and 10). The considerable the reason may be that the release of oxygen radicals due to the instability of the crystal structure is suppressed.

In at least one of the first electron conductive oxide and the second electron conductive oxide, due to the inclusion of (i) Co and (ii) at least one element of Ni and Mn in site B, it is observed that both the battery resistance and the gas generation amount tend to decrease (Examples 3 to 5, 7 to 9, and 11 to 14). The considerable the reason may be that the formation of an inactive high resistance phase and the release of oxygen radicals are suppressed.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A positive electrode for a lithium ion secondary battery comprising:
    a positive electrode composite material layer,
    the positive electrode composite material layer containing composite particles and electron conductive particles,
    the composite particles including positive electrode active material particles and a coating film,
    the coating film being formed on the surface of the positive electrode active material particles,
    the coating film containing a first electron conductive oxide,
    the electron conductive particles being dispersed in the positive electrode composite material layer,
    the electron conductive particles containing a second electron conductive oxide,
    each of the first electron conductive oxide and the second electron conductive oxide having a perovskite structure
    wherein
    each of the first electron conductive oxide and the second electron conductive oxide is represented by the following formula (I):

$$ABO_3 \qquad (I)$$

wherein, in formula (I),
    A represents an element contained in site A of the perovskite structure,
    B represents an element contained in site B of the perovskite structure,
    A represents at least one element selected from the group consisting of La and Sr,
    B represents Co and optionally at least one element selected from a group consisting of Ni and Mn, and
    O represents oxygen; and
    wherein
    the first electron conductive oxide and the second electron conductive oxide have the same chemical composition.

2. The positive electrode for a lithium ion secondary battery according to claim 1, wherein
    site B contains Co and Ni.

3. The positive electrode for a lithium ion secondary battery according to claim 1, wherein
    site B contains Co and Mn.

4. The positive electrode for a lithium ion secondary battery according to claim 1, wherein
    site B contains Co, Ni and Mn.

5. A method for manufacturing a positive electrode for a lithium ion secondary battery, comprising:
    preparing composite particles by forming a coating film on the surface of positive electrode active material particles;
    preparing a positive electrode composite material by mixing the composite particles and electron conductive particles; and
    manufacturing the positive electrode for a lithium ion secondary battery by forming a positive electrode composite material layer containing the positive electrode composite material,
    the coating film containing a first electron conductive oxide,
    the electron conductive particles containing a second electron conductive oxide, and
    each of the first electron conductive oxide and the second electron conductive oxide having a perovskite structure
    wherein
    each of the first electron conductive oxide and the second electron conductive oxide is represented by the following formula (I):

$$ABO_3 \qquad (I)$$

wherein, in formula (I),
    A represents an element contained in site A of the perovskite structure,
    B represents an element contained in site B of the perovskite structure, A represents at least one element selected from the group consisting of La and Sr, B represents Co and optionally at least one element selected from a group consisting of Ni and Mn, and O represents oxygen; and wherein the first electron conductive oxide and the second electron conductive oxide have the same chemical composition.

6. The method according to claim 5, wherein site B contains Co and Ni.

7. The method according to claim 5, wherein site B contains Co and Mn.

8. The method according to claim 5, wherein site B contains Co, Ni and Mn.

9. A positive electrode for a lithium ion secondary battery comprising:

a positive electrode composite material layer, the positive electrode composite material layer containing composite particles and electron conductive particles, the composite particles including positive electrode active material particles and a coating film, the coating film being formed on the surface of the positive electrode active material particles, the coating film containing a first electron conductive oxide, the electron conductive particles being dispersed in the positive electrode composite material layer, the electron conductive particles containing a second electron conductive oxide, each of the first electron conductive oxide and the second electron conductive oxide having a perovskite structure wherein each of the first electron conductive oxide and the second electron conductive oxide is represented by the following formula (I):

$$ABO_3 \qquad (I)$$

wherein, in formula (I),

A represents an element contained in site A of the perovskite structure,

B represents an element contained in site B of the perovskite structure,

A represents at least one element selected from the group consisting of La and Sr, B represents Mn and optionally at least one element selected from a group consisting of Co and Ni, and O represents oxygen; and wherein the first electron conductive oxide and the second electron conductive oxide have the same chemical composition.

10. The positive electrode for a lithium ion secondary battery according to claim 9, wherein site B contains Mn and Ni.

* * * * *